March 14, 1944.  G. E. FRANCK  2,344,036
SIZING TOOL
Filed March 26, 1943
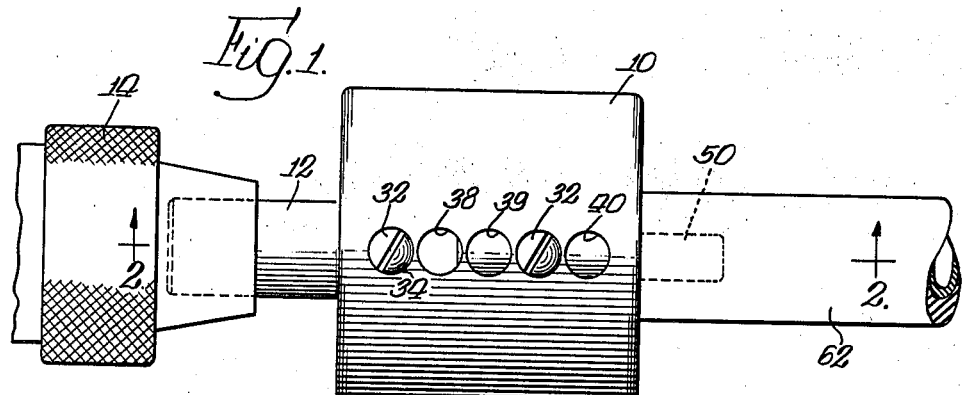
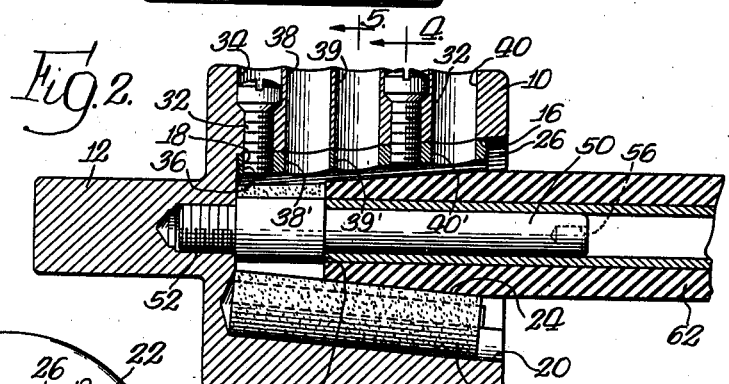
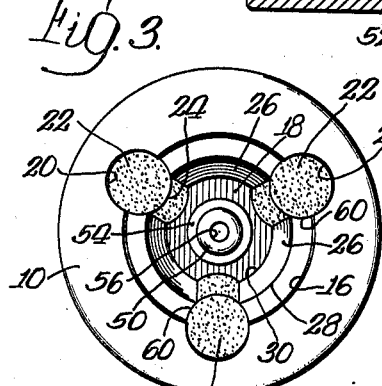
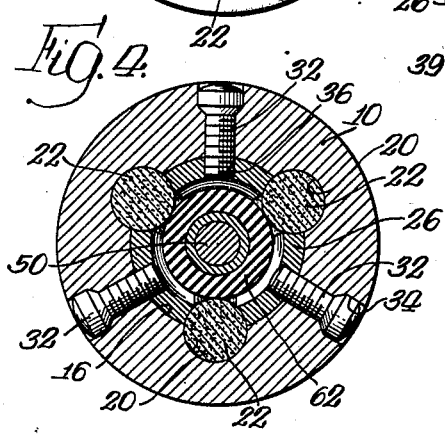
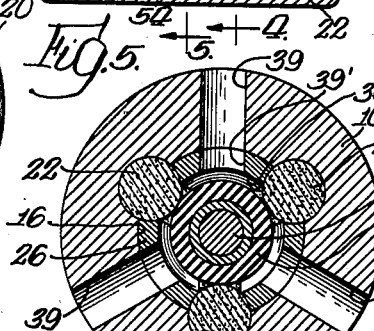
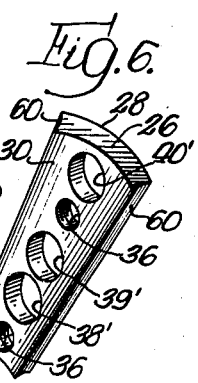
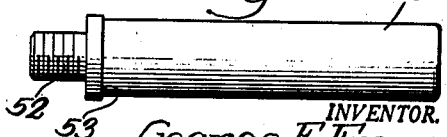
INVENTOR.
George E. Franck,
BY
Vernon D. Beehler
Atty.

Patented Mar. 14, 1944

2,344,036

UNITED STATES PATENT OFFICE 2,344,036

SIZING TOOL

George E. Franck, Riverside, Ill., assignor to The Imperial Brass Manufacturing Company, Chicago, Ill., a corporation of Illinois Application March 26, 1943, Serial No. 480,644

6 Claims. (Cl. 51—204)

My invention relates to tools and particularly a tool which can be used to cut and shape the ends of soft walled tubing such as rubber or synthetic tubing and hose so that couplings of a particular kind can be attached to it.

Among the objects of my invention is to provide a new and improved tool which has a special cutting element capable of cutting away soft material such as rubber smoothly and evenly without gouging the surface.

Another object of my invention is to provide a new and improved rotating tool which has within it a set of abrasive cutting elements which perform what may be readily termed a combined cutting and abrasive action on soft material so that the end of a soft rubber hose can be cut down to a taper shape for example in order to fit into metal couplings of uniform size and construction.

Still another object of my invention is to make a tool for sizing the ends of soft walled tubing having sufficient versatility so that by only slight adjustments it can be accommodated to tubing having a variety of outside and inside diameters; it being also included among the objects to build such a tool so that it is capable of accommodating itself to tubing which is not held to uniformly close tolerances.

A still further object of my invention is to provide a tool for sizing soft walled tubing wherein abrasive cutting elements are used having surface characteristics which prevent their becoming clogged with sticky dust generated by the sizing operation on the soft material and in which means is provided for quickly and effectively removing the abrasive cutting elements so that new elements may be accurately adjusted in their place.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of my tool shown mounted in a rotating chuck.

Figure 2 is a longitudinal sectional view on line 2—2 of Figure 1.

Figure 3 is a right end view of the tool shown in Figure 1.

Figure 4 is a cross sectional view taken on the line 4—4 of Figure 2.

Figure 5 is a cross sectional view taken on the line 5—5 of Figure 2.

Figure 6 is a perspective view of one of the elements for holding cutting elements in place.

Figure 7 is a plan view of a central guide element designed to replace the guide element shown in Figure 2.

Rotating sizing tools known for a great many years, have been designed for such uses as shaping metal rod, working metal tubing, and for shaping wooden dowels and similar materials. Tools in the past, however, have been chiefly limited to knife-like cutting elements which are capable only of working material which can be readily sheared. The present problem involves sizing soft walled tubing such as rubber hose and it has been found that the cutting elements normally employed for sizing tubular members are unsatisfactory. Soft walled tubing made of rubber, plastic, and other synthetic material, rips and tears when cut with a fast rotating knife. It cannot by this means be carefully sized and shaped and left with a satisfactory smooth surface at the point where the cutting takes place.

To perform a satisfactory cutting operation on soft material, the applicant has provided a rotating tool having a body 10 here shown cylindrical in shape which is provided with an extension 12 adapted to be gripped in the jaws of a rotating chuck 14. The body is provided with an axial pocket 16 here shown as having a frusto-conical shape with the large end at the right hand side as viewed in Figure 2 and the small end terminating in a flat bottom 18.

In the sides of the pocket are provided semi-cylindrical recesses 20 which extend substantially in a longitudinal direction parallel to the wall of the pocket 16. In the modification selected for the purpose of illustrating my invention there are shown three semi-cylindrical recesses.

Positioned one in each of the semi-cylindrical recesses is an element 22 for cutting into the tubing. The elements in the embodiment of my invention here shown have a long cylindrical shape. On each of the elements is an abrasive exterior which is designed to rub upon the surface of the tubing. The depth to which the elements are received into the recesses can best be seen in Figures 3, 4, and 5. The abrasive elements are so positioned that they extend in the form shown at a direction oblique to the central axis of the body so that when rotated, a line at the center of the inner circumference indicated by the reference character 24 traces a frusto-conical path when the body is rotated. It is the path traced by the innermost surface of the cutting element which determines the eventual shape of the end of the tubing.

In order to hold the cutting elements in place, there is provided a plurality of clips 26 which as best illustrated in Figure 6 have a curved wedge shape, narrower at one end than the other. The clips are designed to fit and fill the space between the adjacent cutting elements. As will be noted, the outside surface 28 of the clips is curved to fit against the wall of the pocket 16. The inside surface 30 of the clips is likewise curved so that together the sides of the several clips form generally a frusto-conical space inside the pocket of the body. It should be further noted that the surface 30 of the clips is spaced outwardly from the path traced by the innermost portion 24 of the cutting elements. Building the clips in this manner leaves a pocket for the collection of dust generated during the cutting operation. The clips are held in place by machine screws 32 which extend from the recesses 34 in the body through the wall of the body and into threaded holes 36 in the clips.

So that the dust generated during the cutting operation may be liberated, radial passages 38, 39, and 40 are provided. The passages extend through the wall of the body and likewise clear through the adjacent clips where corresponding passages $38^1$, $39^1$, and $40^1$ are in axial alignment with the passages in the body. The radial arrangement can be best seen in Figure 5. It will be noted that the radial passages communicate with the inner surface 30 of the clips so that dust which collects between the adjacent cutting elements can be spun outwardly by centrifugal force to the exterior.

In order to accommodate all kinds of tubes within one tool, there is provided a central guide member 50 which has a threaded engagement 52 at the bottom of the pocket in the body. The guide is made of a diameter which will slide easily into the tubing without making a sloppy fit. It will be noted that for ease of operation, the guide extends outside of the right hand face of the body 10 so that a tube may be easily slipped over it before the cutting operation starts. On the guide there is a shoulder 54 against which a tube may abut when it is thrust into the tool. The guide is provided with a socket 56 in which a socket wrench can be inserted to alternately unscrew and release the guide and to tighten it in place when required.

A guide 51 of different diameter from the guide 50 and having a shoulder 53 of different length and diameter may be provided and substituted for the guide 50 whenever a different tube having different dimensions is to be worked upon.

In operation the cutting elements or cylinders 20 are inserted into their respective recesses and while in position the clips 26 are inserted between them. Rounded lateral edges 60 on the clips may be provided to fit around the abrasive cutting elements to more securely hold them in position. It will be noted that since the cylindrical cutting elements are received for only one-half their diameter into the semi-cylindrical recesses, the positioning of the rounded edges of the clips against them is sufficient to hold the elements in place. After the clips are in place, a guide 50 of appropriate size to fit the tubing upon which the operation is to be performed and a shoulder 54 of proper height is selected and screwed into the threaded connection 52 at the bottom of the pocket.

The tool is then clamped in a rotating device such as the chuck 14 and rotated. Tubing 62 which is to be worked upon is then squared off at the end and applied over the protruding end of the guide 50 and pushed into the tool in properly guided relationship with respect to the cutting elements. As the tube is pushed into the tool, the rotating cutting elements cut or wear down the soft exterior of the tubing. The tube is pushed into the pocket until the squared end abuts against the shoulder 54. The position of the shoulder will determine the depth of the cut in the wall of the tubing. As dust collects from the cutting operation it will accumulate adjacent the surface 30 between the cutting elements and from there will be directed by centrifugal force outwardly through the passages 38, 39, and 40; thus preventing the tool from becoming clogged. When a tube of different diameter internally, externally, or both, is to be sized, the guide 50 can be unscrewed and removed and a guide 51 of other dimensions inserted in its place. By use of a guide, the tube is correctly centered with respect to its inside diameter and the wall thickness at the end which is sized will be uniform, regardless of the initial outside diameter of the tube. Likewise, by reason of providing a stiff central guide, cutting operations can be performed on tubing which has no rigid central core and which is of such material that it could not support itself during a cutting operation without the use of a guide.

The clips, cutting elements and guide can all be easily removed in a short space of time for cleaning and subsequent replacement or renewal.

I have thus provided an effective and efficient cutting tool for soft walled tubing which can be adapted to many different sizes of tubing and which can be kept in good cutting condition for long periods of operation.

Some changes may be made in the arrangement and construction of the various parts of my tool for sizing the ends of soft walled tubing without departing from the real spirit and purpose of my invention, and it is my intention to cover by my claims, any modified forms of structure or use of mechanical equivalents, which may be reasonably included within their scope.

I claim:

1. A tool for sizing the ends of soft walled tubing comprising a body having a pocket extending inwardly from one end, a plurality of spaced elements positioned at the walls of the pocket having rounded abrasive surfaces stationarily positioned in the body so that when rotated the innermost portions of the rounded abrasive surfaces trace a path about the axis of of the body corresponding to the intended shape and size of the tube end, clamping means on the body securing the elements in place and passages extending from the pocket for relief of dust produced by the sizing operation.

2. A tool for tapering the ends of soft walled tubing comprising a body having a pocket extending inwardly from one end, a plurality of spaced elongated elements positioned at the walls of the pocket having rounded abrasive surfaces sloping inwardly toward the bottom, clamping means on the body securing the elements in place and passages extending outwardly from the pocket for relief of dust produced by the tapering operation, and a longitudinal guide in the pocket and concentric therewith adapted to be inserted into the tube and to position the tube during the tapering operation.

3. A sizing tool for tapering the ends of soft walled tubing comprising a body having a frusto-conical pocket extending axially inward from one end, a plurality of spaced cylindrical elements having abrasive surfaces positioned at the walls of the pocket and sloping inwardly toward the bottom, clamping means on the body securing the cylindrical elements in place and passages extending outward from the pocket for relief of dust produced by the sizing operation, and a central longitudinal guide in the pocket adapted to be inserted into the tube and to position the tube during the sizing operation.

4. A tool for sizing the ends of soft walled tubing comprising a body adapted to be mounted for rotation in a machine, said body having an axial pocket, a plurality of longitudinally extending positioning means spaced around the sides of the pocket, a plurality of tube sizing elements in said positioning means each having a long working edge for cutting into the wall of the tubing which extends in a direction oblique to the tube axis and adapted when rotated to determine the shape and size of the end of the tube, clips attached to the body and adjacent sizing elements spaced outwardly from the path of rotation of the working edges of the sizing elements to provide relief for dust produced in the sizing operation, and a plurality of passages communicating with the space between said sizing elements and the exterior of the body to permit centrifugal discharge of dust created during the sizing operation.

5. A tool for tapering the ends of soft walled tubing comprising a body adapted to be mounted in a rotating mechanism, said body having an axial pocket on one side, a plurality of longitudinally extending rounded recesses in the wall of the pocket, a plurality of rounded tube sizing elements having an abrasive surface positioned one in each of said recesses so that upon rotation a line on the innermost part of the surface traces a frusto-conical path coextensive with the tapered end of a sized tube, clips in the space between adjacent rounded elements having the inner surfaces thereof occupying a position spaced radially from the said conical path to provide relief for dust produced in the tapering operation and portions thereof bearing against the sides of the rounded elements to hold them in place, anchoring devices attached to the body and clips to anchor said clips in position, said body and said clips having a plurality of respectively aligned passages therethrough to permit discharge of the dust.

6. A sizing tool for tapering the outside ends of soft walled tubing comprising a body having an extension thereon adapted to be mounted in a rotating chuck, said body having an axial pocket on the side remote from the extension tapering inwardly and a bottom therefor at the inner end, a plurality of not less than three longitudinally extending semi-cylindrical recesses in the wall of the pocket, a plurality of cylindrical tube sizing elements having each an abrasive surface positioned one in each of said recesses so that upon rotation a line on the innermost part of the surface traces a frusto-conical path coextensive with the tapered end of a sized tube, segmental clips filling the space between adjacent cylindrical elements having the inner surfaces thereof spaced outwardly from the said conical path to provide relief for dust produced in the sizing operation and the edges thereof bearing against the sides of the cylindrical elements to hold them in place, bolts extending through the body and the clips to anchor said clips in position, said body and said clips having a plurality of respectively aligned passages therethrough to permit discharge of the dust, and a removable central guide extending outside the pocket adapted to be inserted into the tubing, said guide being fastened in the bottom of the pocket, a shoulder on the guide for abutment against the tube end at its innermost position, said guide being adapted to be removed from the pocket for replacement by another guide having a differently positioned shoulder and different diameter.

GEORGE E. FRANCK.